United States Patent [19]
Itoh et al.

[11] Patent Number: 5,866,088
[45] Date of Patent: Feb. 2, 1999

[54] PROCESS FOR PREPARING ANHYDROUS MAGNESIUM HALIDE SOLUTION AND PROCESS FOR PREPARING SOLID TITANIUM CATALYST COMPONENT FOR OLEFIN POLYMERIZATION

[75] Inventors: Yoshinao Itoh; Masayuki Takeda, both of Kuga-gun, Japan

[73] Assignee: Mitsui Chemicals, Inc., Tokyo, Japan

[21] Appl. No.: 827,222

[22] Filed: Mar. 28, 1997

[30] Foreign Application Priority Data

Apr. 1, 1996 [JP] Japan .................................. 8-078815

[51] Int. Cl.$^6$ .............................. C01F 1/00; C01F 5/00; C01F 11/00; C22B 26/20
[52] U.S. Cl. .......................... 423/158; 423/184; 423/493; 423/498; 502/103; 502/104; 502/107; 502/111; 502/123; 502/125; 502/126; 502/127
[58] Field of Search ..................................... 423/158, 184, 423/492, 498; 502/226

[56] References Cited

U.S. PATENT DOCUMENTS

| | | | |
|---|---|---|---|
| 2,381,994 | 8/1945 | Belchetz | 423/158 |
| 3,323,875 | 6/1967 | Been | 423/158 |
| 3,341,282 | 9/1967 | Kimberlin, Jr. et al. | 23/91 |
| 3,352,634 | 11/1967 | F.J. Buchmann | 23/91 |
| 3,419,347 | 12/1968 | Weissenberg | 423/498 |
| 4,162,297 | 7/1979 | Aubry et al. | 423/184 |
| 4,861,847 | 8/1989 | Mao et al. | 526/125 |
| 4,952,649 | 8/1990 | Kioka et al. | 502/128 |

FOREIGN PATENT DOCUMENTS

| | | | |
|---|---|---|---|
| 0 022 675 | 1/1981 | European Pat. Off. | 502/226 |
| 950678 | 8/1982 | U.S.S.R. | 423/158 |
| 255042 | 4/1927 | United Kingdom | 423/498 |
| 2045736 | 11/1980 | United Kingdom . | |

*Primary Examiner*—Mark L. Bell
*Assistant Examiner*—J. Pasterczyk
*Attorney, Agent, or Firm*—Sherman and Shalloway

[57] ABSTRACT

Disclosed is a process for preparing an anhydrous magnesium halide solution, comprising a step of distilling water off from an oxygen-containing organic solvent solution of hydrous magnesium halide containing at least calcium as an impurity, to prepare an oxygen-containing organic solvent solution of anhydrous magnesium halide, wherein a potassium compound is added in said step to precipitate calcium and potassium, followed by removing the calcium and potassium. According to this process, an anhydrous magnesium halide solution scarcely containing calcium can be prepared from hydrous magnesium halide containing calcium as an impurity. Also disclosed is a process for preparing a solid titanium catalyst component for olefin polymerization, comprising contacting the anhydrous magnesium halide solution obtained by the above process with a liquid titanium compound to precipitate a solid titanium catalyst component. According to this process, a solid titanium catalyst component for olefin polymerization, which has high catalytic activity, can be prepared by the use of the anhydrous magnesium halide solution.

13 Claims, No Drawings

PROCESS FOR PREPARING ANHYDROUS MAGNESIUM HALIDE SOLUTION AND PROCESS FOR PREPARING SOLID TITANIUM CATALYST COMPONENT FOR OLEFIN POLYMERIZATION

FIELD OF THE INVENTION

The present invention relates to a process for preparing an anhydrous magnesium halide solution scarcely containing impurities and to a process for preparing a solid titanium catalyst component for olefin polymerization using the anhydrous magnesium halide solution.

BACKGROUND OF THE INVENTION

Catalysts in which titanium compounds are supported on magnesium halides have been hitherto known as those used for preparing homopolymers of ethylene or α-olefins or those used for preparing ethylene/α-olefin copolymers. One example of the olefin polymerization catalysts is a catalyst comprising a solid titanium catalyst component, which comprises magnesium, titanium, halogen and an electron donor, and an organometallic compound catalyst component.

For preparing the solid titanium catalyst component used as the olefin polymerization catalyst component, many proposals have been made so far. For example, it is known to contact a halogen-containing liquid magnesium compound with a liquid titanium compound to produce a solid product.

In the conventional processes for preparing solid titanium catalyst component, anhydrous magnesium chloride for industrial use and/or reagent use has been employed as the magnesium halide compound. However, the anhydrous magnesium chloride for industrial use and/or reagent use has problems in cost, stability of supply and the like. Hence, substitution of hydrous magnesium chloride available at low cost and stably, e.g., hydrous magnesium chloride produced from seawater, that is generally called "bittern", will be of great industrial value.

However, a solution of the anhydrous magnesium chloride obtained from the bittern contains calcium as impurity. When the solution of the anhydrous magnesium chloride containing calcium as impurity is used to prepare a solid titanium catalyst component, there is such a problem that the calcium as impurity decreases the polymerization activity of the resulting catalyst.

Under such circumstances as mentioned above, the present inventors have studied processes for preparing anhydrous magnesium halides containing no calcium as impurity from hydrous magnesium halides (e.g., hydrous magnesium chloride) containing at least calcium as impurity. As a result, they have found that an anhydrous magnesium halide solution containing no calcium as impurity can be obtained by a process comprising distilling water off from an oxygen-containing organic solvent solution of hydrous magnesium halide containing at least calcium as impurity to prepare an oxygen-containing organic solvent solution of anhydrous magnesium halide, wherein in any of stage of the step of preparing the oxygen-containing organic solvent solution of hydrous magnesium halide to the step of preparing the oxygen-containing organic solvent solution of anhydrous magnesium halide, a potassium compound is added to contact the calcium (calcium compound) with the potassium compound and thereby precipitate calcium (calcium compound) together with potassium (potassium compound), followed by removing them from the oxygen-containing organic solvent solution of anhydrous magnesium halide.

The present inventors have further found that a solid titanium catalyst component of high activity can be prepared by the use of the anhydrous magnesium halide solution obtained by the above process.

OBJECT OF THE INVENTION

The present invention has been made under such circumstances as described above, and it is an object of the invention to provide a process for preparing an anhydrous magnesium halide solution scarcely containing calcium from hydrous magnesium halide solution containing calcium as impurity. It is another object of the invention to provide a process for preparing a solid titanium catalyst component using, as a starting material, the anhydrous magnesium halide solution obtained by the above process.

SUMMARY OF THE INVENTION

The process for preparing an anhydrous magnesium halide solution according to the invention is a process comprising distilling water off from an oxygen-containing organic solvent solution of hydrous magnesium halide containing at least calcium as impurity, to prepare an oxygen-containing organic solvent solution of anhydrous magnesium halide, wherein in any of stage of the step of preparing the oxygen-containing organic solvent solution of hydrous magnesium halide to the step of preparing the oxygen-containing organic solvent solution of anhydrous magnesium halide, a potassium compound is added to contact the calcium (calcium compound) with potassium (potassium compound) and thereby precipitate calcium (calcium compound) together with potassium (potassium compound), followed by removing them from the oxygen-containing organic solvent solution of anhydrous magnesium halide.

According to the present invention, in any of the stage of the step of preparing the oxygen-containing organic solvent solution of anhydrous magnesium halide containing at least calcium as impurity, a potassium compound may be added to contact the calcium (calcium compound) with potassium (potassium compound) and thereby precipitate calcium (calcium compound) together with potassium (potassium compound), followed by removing them from the oxygen-containing organic solvent solution of anhydrous magnesium halide.

In the present invention, the hydrous magnesium halide is preferably hydrous magnesium chloride, more preferably hydrous magnesium chloride produced from seawater.

Examples of methods to distill off water from the oxygen-containing organic solvent solution of hydrous magnesium halide include a method of passing an inert gas through the oxygen-containing organic solvent solution of hydrous magnesium halide and a method of azeotropically distilling off water and an oxygen-containing organic solvent from the oxygen-containing organic solvent solution of hydrous magnesium halide.

The process for preparing a solid titanium catalyst component for olefin polymerization according to the invention is a process comprising contacting the anhydrous magnesium halide solution, which is prepared by the above-mentioned process, with a liquid titanium compound to precipitate a solid titanium catalyst component.

In the process for preparing a solid titanium catalyst component for olefin polymerization according to the invention, a solution obtained by adding a hydrocarbon solvent to the anhydrous magnesium halide solution prepared by the above process or a solution obtained by adding a hydrocarbon solvent and an electron donor other than the oxygen-containing organic solvent to the anhydrous magnesium halide solution prepared by the above process may be contacted with the liquid titanium compound.

DETAILED DESCRIPTION OF THE INVENTION

The process for preparing an anhydrous magnesium halide solution and the process for preparing a solid titanium catalyst component for olefin polymerization according to the invention are described in detail hereinafter.

First, the process for preparing an anhydrous magnesium halide solution according to the invention is described.

In the present invention, hydrous magnesium halide containing at least calcium (calcium compound) as impurity and an oxygen-containing organic solvent are mixed in a molar ratio of 1:2 to 1:100, preferably 1:2 to 1:30, to prepare an oxygen-containing organic solvent solution of hydrous magnesium halide.

As the hydrous magnesium halide, hydrous magnesium chloride, hydrous magnesium bromide or hydrous magnesium iodide is used. Of these, preferably used is hydrous magnesium chloride, and particularly preferably used is hydrous magnesium chloride produced from seawater, that is generally called "bittern".

The term "hydrous magnesium halide" means magnesium halide containing water, and the water is not limited to water of crystallization or adsorbed water. For example, when the hydrous magnesium halide is hydrous magnesium chloride, the hydrous magnesium chloride includes magnesium chloride hexahydrate, magnesium chloride hexahydrate devoid of a part of water of crystallization, a mixture of magnesium chloride hexahydrate and anhydrous magnesium chloride, and a mixture of magnesium chloride hexahydrate and other water than water of crystallization.

The oxygen-containing organic solvents employable herein are, for example, ethers, ketones, alcohols, organic epoxy compounds and organic phosphates.

Examples of the ethers include tetrahydrofuran, anisole, diphenyl ether, isopropyl ether and acyl ether.

Examples of the ketones include methyl ethyl ketone and methyl isobutyl ketone.

Examples of the alcohols include aliphatic alcohols, such as ethanol, ethylene glycol, 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alicyclic alcohols, such as cyclohexanol and methylcyclohexanol; aromatic alcohols, such as benzyl alcohol, methylbenzyl alcohol, isopropylbenzyl alcohol, α-methylbenzyl alcohol and α,α-dimethylbenzyl alcohol; and aliphatic alcohols containing alkoxy group, such as n-butyl cellosolve and 1-butoxy-2-propanol.

Examples of the organic epoxy compounds include ethylene oxide, propylene oxide, butadiene oxide and epoxycyclopropane.

Examples of the organic phosphates include trimethyl phosphate, triethyl phosphate, tributyl phosphate and trimethyl phosphite.

Of these, preferable are aliphatic alcohols, and particularly preferable is 2-ethylhexanol.

These oxygen-containing organic solvents may be used singly or in combination of plural kinds.

In the process for preparing an anhydrous magnesium halide solution according to the invention, then, water is distilled off from the oxygen-containing organic solvent solution of hydrous magnesium halide to prepare an oxygen-containing organic solvent solution of anhydrous magnesium halide. According to the present invention, in any of the stage of the step of preparing the oxygen-containing organic solvent solution of hydrous magnesium halide to the step of preparing the oxygen-containing organic solvent solution of anhydrous magnesium halide, a potassium compound is added to contact the calcium (calcium compound) with potassium (potassium compound).

More specifically, the potassium compound may be added by dissolving the hydrous magnesium halide and the potassium compound in the oxygen-containing organic solvent at almost the same time, or it may be added prior to distillation of water off from the oxygen-containing organic solvent solution of hydrous magnesium halide or during the distillation of water off from the oxygen-containing organic solvent solution of hydrous magnesium halide. Further, the potassium compound may be added after water is distilled off from the oxygen-containing organic solvent solution of hydrous magnesium halide to prepare an oxygen-containing organic solvent solution of anhydrous magnesium halide.

Addition of the potassium compound may be carried out plural times.

The potassium compound is added in such an amount that the amount thereof finally becomes 0.01 to 100 times by mol, preferably 0.05 to 30 times by mol, more preferably 0.1 to 20 times by mol, as much as the calcium (calcium compound) contained as impurity in the hydrous magnesium halide.

Examples of the potassium compounds include potassium carbonate, potassium bicarbonate, potassium acetate, potassium chloride, potassium dihydrogenphosphate, potassium ethoxide and potassium hydrogensulfate.

There is no specific limitation on the method to distill off water from the oxygen-containing organic solvent solution of hydrous magnesium halide, so far as water is distilled off from the solution. Examples of the methods of distilling water off from the solution include a method of passing an inert gas through the oxygen-containing organic solvent solution of hydrous magnesium halide to distill off water on the exhaust side and a method of heating the oxygen-containing organic solvent solution of hydrous magnesium halide to azeotropically distill off the oxygen-containing organic solvent and water from the solution.

Hereinafter the process, wherein the potassium compound is added to the oxygen-containing organic solvent solution of hydrous magnesium halide, and, an inert gas is passed through the solution to distill off water on the exhaust side, is now described in more detail.

When an inert gas is passed through the oxygen-containing organic solvent solution of hydrous magnesium halide (referred to as "hydrous mixed solution" hereinafter) to distill off water on the exhaust side and thereby prepare an oxygen-containing organic solvent solution of anhydrous magnesium halide, it is preferable to heat the hydrous mixed solution. It is more preferable to heat the hydrous mixed solution with stirring.

Heating of the hydrous mixed solution may be carried out under atmospheric pressure, reduced pressure or pressure. The heating temperature is preferably a temperature close to a boiling point of the hydrous mixed solution, said boiling point being depending on the pressure and the composition of the solution. More specifically, the heating temperature is in the range of 100° to 200° C., preferably 130° to 170° C. During the heating, the temperature and/or the pressure may be varied.

Examples of the gases to be passed through the hydrous mixed solution include nitrogen gas, helium gas and argon gas. Of these, nitrogen gas is preferable because it is most economical.

The amount of nitrogen gas passed through the hydrous mixed solution is in the range of 1 to 1,000 N-1/hr, preferably 1 to 300 N-1/hr, based on 1 mol of the magnesium halide, though it varies depending on the temperature and the pressure in the heating process.

It is desirable that water content in the oxygen-containing organic solvent solution of anhydrous magnesium halide obtained after nitrogen gas is passed through the hydrous mixed solution is not more than 0.4% by weight, preferably not more than 0.2% by weight. The water content in the solution can be measured by the Karl Fischer method.

In the present invention, the oxygen-containing organic solvent solution of anhydrous magnesium halide obtained above may be further heated to distill off a part of the oxygen-containing organic solvent.

In this case, the heating temperature is usually not lower than 170° C., preferably not lower than 180° C.

In the oxygen-containing organic solvent solution of anhydrous magnesium halide from which a part of the oxygen-containing organic solvent is distilled off as described above, the molar ratio between the anhydrous magnesium halide and the oxygen-containing organic solvent is in the range of 1:2 to 1:10, preferably 1:2 to 1:5.

When the molar ratio between the anhydrous magnesium halide and the oxygen-containing organic solvent is in the above range, the solid titanium catalyst component can be obtained efficiently.

When water is distilled off from the hydrous magnesium halide in the presence of the potassium compound as described above, a sodium compound is precipitated. At the same time, a calcium compound is precipitated together with the potassium compound. If the potassium compound is absent, no calcium compound is precipitated though a sodium compound is precipitated.

The calcium compound thus precipitated is removed from the oxygen-containing organic solvent solution of anhydrous magnesium halide, together with the sodium compound and the potassium compound, whereby an oxygen-containing organic solvent solution of anhydrous magnesium halide (anhydrous magnesium halide solution) containing no calcium can be obtained.

There is no specific limitation on the method to remove the calcium compound, etc. from the oxygen-containing organic solvent solution of anhydrous magnesium halide, so far as the calcium compound, etc. are removed from the solution. However, filtration is preferably used to remove them. There is no specific limitation on the filter medium for use in the filtration, and various filter media ordinarily used, such as Teflon™, SUS and cellulose, are employable. The mesh size of the filter medium is usually 1 to 100 μm, preferably 5 to 50 μm. The temperature in the filtration is usually 20° to 150° C., preferably 50° to 130° C. As the filtration, any of filtration at atmospheric pressure, filtration under pressure and filtration under reduced pressure are employable.

If the oxygen-containing organic solvent is removed from the anhydrous magnesium halide solution by means of distillation or the like, anhydrous magnesium halide can be obtained.

In the present invention, the following process is also possible. That is, anhydrous magnesium halide containing at least calcium as impurity is used as a starting material similarly to the above process. In any of the stage of the step of preparing an oxygen-containing organic solvent solution of the anhydrous magnesium halide, a potassium compound is added to contact the calcium (calcium compound) with potassium (potassium compound) and thereby precipitate calcium (calcium compound) together with potassium (potassium compound), followed by removing them from the oxygen-containing organic solvent solution of anhydrous magnesium halide.

The process for preparing an anhydrous magnesium halide solution according to the invention is described above. Next, the process for preparing a solid titanium catalyst component for olefin polymerization according to the invention is described. In the below-described process to prepare a titanium catalyst component, anhydrous magnesium chloride is used as the anhydrous magnesium halide.

In the process for preparing a solid titanium catalyst component for olefin polymerization according to the invention, the oxygen-containing organic solvent solution of anhydrous magnesium chloride (anhydrous magnesium chloride solution) scarcely containing impurities such as calcium, that is obtained by the above-described process, is contacted with a liquid titanium compound to prepare a solid titanium catalyst component for olefin polymerization. The anhydrous magnesium chloride solution may be contacted as such with a liquid titanium compound, or the anhydrous magnesium chloride solution may be contacted with a liquid titanium compound after a part of the oxygen-containing organic solvent is distilled off from the solution.

In the first place, to the anhydrous magnesium chloride solution obtained above is optionally added a hydrocarbon solvent and/or an electron donor (electron donor (a)) other than the above-mentioned oxygen-containing organic solvent, to prepare a magnesium compound solution.

Examples of the hydrocarbon solvents used herein include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures of these hydrocarbons.

The electron donor (a) is used in an amount of 0.01 to 1.0 mol, preferably 0.1 to 0.5 mol, based on 1 mol of the magnesium compound. The contact temperature is usually –20° to 300° C., preferably 20° to 200° C., and the contact time is usually 5 to 240 minutes, preferably 10 to 120 minutes.

The electron donor (a) may be used singly or in combination of plural kinds.

Examples of the electron donors (a) include oxygen-containing electron donors, such as alcohols, esters, ethers, phenols, ketones, aldehydes, carboxylic acids, organic acid halides, acid amides, acid anhydrides and alkoxysilanes, and nitrogen-containing electron donors, such as ammonias, amines, nitrites, pyridines and isocyanates, details of which being described later.

The magnesium compound solution obtained above is then contacted with a liquid titanium compound to prepare a mixed solution containing the magnesium compound and the liquid titanium compound (magnesium-titanium solution).

The liquid titanium compound is used in an amount of 2 to 100 g·atom, preferably 4 to 50 g·atom, based on 1 g·atom of magnesium in the magnesium compound solution. The contact temperature is usually −70° to 200° C., preferably −70 to 50° C., and the contact time is usually 5 to 300 minutes, preferably 30 to 180 minutes.

The liquid titanium compound is, for example, a tetravalent halogen-containing titanium compound represented by the following formula:

$$Ti(OR)_nX_{4-n}$$

wherein R is a hydrocarbon group, X is a halogen atom, and $0 \leq n \leq 4$.

Examples of such halogen-containing titanium compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;

alkoxytitanium dihalides, such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$;

alkoxytitanium monohalides, such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(O\text{-}n\text{-}C_4H_9)_4$ and $Ti(O\text{-}iso\text{-}C_4H_9)_4$.

These titanium compounds may be used singly or in combination. Further, these compounds may be used after diluted with such hydrocarbon solvents as mentioned above.

The magnesium-titanium solution obtained above is then heated at a temperature of 20° to 300° C., preferably 50° to 150° C., to obtain a solid titanium catalyst component suspended in the hydrocarbon solvent. The heating time is usually 10 to 360 minutes, preferably 30 to 300 minutes.

In the present invention, the magnesium-titanium solution may be further contacted with the electron donor (a). The electron donor (a) may be used singly or in combination of plural kinds.

The electron donor (a) is used in an amount of 0.01 to 5 mol, preferably 0.1 to 1 mol, based on 1 mol of the magnesium compound.

In the present invention, it is possible that the resulting suspension is subjected to solid-liquid separation by means of filtration or the like, then the resulting solid (solid titanium catalyst component) is recovered, and the solid is further contacted with the liquid titanium compound.

The hydrocarbon suspension of the solid titanium catalyst component obtained above can be used as an olefin polymerization catalyst component, but the suspension may be subjected to solid-liquid separation by means of filtration or the like, followed by drying the resulting solid.

The solid titanium catalyst component thus obtained usually contains 10 to 30% by weight of magnesium, 0.5 to 10% by weight of titanium, 50 to 70% by weight of halogen, 0 to 10% by weight of hydrocarbon and 0 to 50% by weight of the electron donor (a).

As the electron donor (a), the compounds exemplified below are employable in the invention.

Examples of alcohols include methanol, ethanol, propanol, trichloromethanol, trichloroethanol and trichlorohexanol.

Examples of esters include:

organic acid esters of 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarone, phthalide and ethyl carbonate;

orthotitanic acid esters, such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate and cyclohexyl orthotitanate;

polytitanic acid esters, such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate and cyclohexyl polytitanate; and metallic acid esters, such as vanadic acid esters, niobic acid esters and zirconic acid esters, wherein titanium is replaced with vanadium, niobium and zirconium, respectively, in the titanic acid esters.

Also employable are polycarboxylic acid esters having skeletons represented by the following formulas.

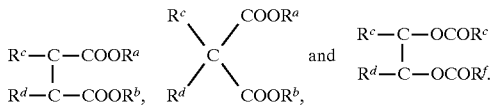

In the above formulas, $R^a$ is a substituted or unsubstituted hydrocarbon group, $R^b$, $R^e$ and $R^f$ are each a hydrogen atom or a substituted or unsubstituted hydrocarbon group, $R^c$ and $R^d$ are each a hydrogen atom or a substituted or unsubstituted hydrocarbon group, at least one of $R^c$ and $R^d$ is a substituted or unsubstituted hydrocarbon group, and $R^c$ and $R^d$ may be bonded to each other to form a cyclic structure. When the hydrocarbon groups $R^a$ to $R^f$ are substituted, their substituents contain a hetero atom such as N, O or S, and they have groups such as C—O—C, COOR, COOH, OH, $SO_3H$, —C—N—C— and $NH_2$.

Examples of such polycarboxylic acid esters include aliphatic polycarboxylic acid esters, alicyclic polycarboxylic acid esters, aromatic polycarboxylic acid esters and heterocyclic polycarboxylic acid esters.

Of these, preferable are n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4-furandicarboxylate.

Examples of ethers include those of 2 to 20 carbon atoms, such as methyl ether, ethyl ether, isopropyl ether, butyl ether, amyl ether, tetrahydrofuran, anisole and diphenyl ether.

Also employable as ethers are polyether compounds represented by the following formula:

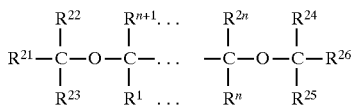

wherein n is an integer of $2 \leq n \leq 10$, $R^1$ to $R^{26}$ are each a substituent having at least one element selected from the group consisting of carbon, hydrogen, oxygen, halogen, nitrogen, sulfur, phosphorus, boron and silicon, arbitrary groups among $R^1$ to $R^{26}$, preferably $R^1$ to $R^{20}$, may form a ring other than a benzene ring in cooperation, and the main chain may contain an atom other than carbon.

Of the polyether compounds, preferable are 1,3-diethers, and particularly preferable are 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 2-isopropyl-2-cyclohexyl-1,3-dimethoxypropane, 2-isopropyl-2-s-butyl-1,3-dimethoxypropane, 2,2-diphenyl-1,3-dimethoxypropane and 2-isopropyl-2-cyclopentyl-1,3-dimethoxypropane.

Examples of phenols include those of 6 to 20 carbon atoms, such as phenol, cresol, xylenol, ethylphenol, propylphenol, nonylphenol, cumylphenol and naphthol, which may contain lower alkyl group.

Examples of ketones include those of 3 to 15 carbon atoms, such as acetone, methyl ethyl ketone, methyl isobutyl ketone, acetophenone, benzophenone and benzoquinone.

Examples of aldehydes include those of 2 to 15 carbon atoms, such as acetaldehyde, propionaldehyde, octylaldehyde, benzaldehyde, tolualdehyde and naphthaldehyde.

Examples of organic acid halides include acid halides of 2 to 15 carbon atoms, such as acetyl chloride, benzoyl chloride, toluyl chloride and anisoyl chloride.

Examples of acid amides include N,N-diemthylacetamide, N,N-diethylbenzamide and N,N-dimethyltoluamide.

Examples of acid anhydrides include acetic anhydride, phthalic anhydride and benzoic anhydride.

Examples of amines include trimethylamine, triethylamine, tributylamine, tribenzylamine and tetramethylethylenediamine.

Examples of pyridines include pyridine, methylpyridine, ethylpyridine and dimethylpyridine.

The solid titanium catalyst component obtained by the above process can be used for olefin polymerization in combination with, for example, an organometallic compound of a metal of Group I to Group III of the periodic table.

Examples of the organometallic compounds of Group I to Group III metals include organoaluminum compounds, alkyl complex compounds of Group I metals and aluminum, and organometallic compounds of Group II metals.

The organoaluminum compounds are, for example, compounds represented by the following formula:

$$R^g{}_nAlX_{3-n}$$

wherein $R^g$ is a hydrocarbon group of 1 to 12 carbon atoms, X is halogen or hydrogen, and n is 1 to 3.

Examples of such organoaluminum compounds include:
trialkylaluminums, such as trimethylaluminum, triethylaluminum, triisopropylaluminum, triisobutylaluminum, trioctylaluminum and tri-2-ethylhexylaluminum;
alkenylaluminums, such as isoprenylaluminum;
dialkylaluminum halides, such as dimethylaluminum chloride, diethylaluminum chloride, diisopropylaluminum chloride, diisobutylaluminum chloride and dimethylaluminum bromide;
alkylaluminum sesquihalides, such as methylaluminum sesquichloride, ethylaluminum sesquichloride, isopropylaluminum sesquichloride, butylaluminum sesquichloride and ethylaluminum sesquibromide;
alkylaluminum dihalides, such as methylaluminum dichloride, ethylaluminum dichloride, isopropylaluminum dichloride and ethylaluminum dibromide; and
alkylaluminum hydrides, such as diethylaluminum hydride and diisobutylaluminum hydride.

The alkyl complex compounds of Group I metals and aluminum are, for example, compounds represented by the following formula:

$$M^iAlR^h{}_4$$

wherein $M^i$ is Li, Na or K, and $R^h$ is a hydrocarbon group of 1 to 15 carbon atoms.

Examples of such alkyl complex compounds include $LiAl(C_2H_5)_4$ and $LiAl(C_7H_{15})_4$.

The organometallic compounds of Group II metals are, for example, compounds represented by the following formula:

$$R^jR^kM^2$$

wherein $R^j$ and $R^k$ are each a hydrocarbon group of 1 to 15 carbon atoms or halogen, when any of them is not halogen, they are the same as or different from each other, and $M^2$ is Mg, Zn or Cd.

Examples of such organometallic compounds include diethyl zinc, diethyl magnesium, butyl ethylmagnesium, ethylmagnesium chloride and butylmagnesium chloride.

The solid titanium catalyst component obtained by the above process may be used for olefin polymerization in combination with the electron donor (a) and/or the following electron donor (b), in addition to the organometallic compound.

The electron donor (b) is, for example, an organosilicon compound represented by the following formula:

$$R_nSi(OR')_{4-n}$$

wherein R and R' are each a hydrocarbon group, and 0<n<4.

Examples of such organosilicon compounds include ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

Also employable as the electron donors (b) are:
nitrogen-containing electron donors, such as 2,6-substituted piperidines, 2,5-substituted piperidines, substituted methylenediamines (e.g., N,N,N',N'-tetramethylmethylenediamine and N,N,N',N'-tetraethylmethylenediamine), and substituted imidazolidines (e.g., 1,3-dibenzylimidazolidine and 1,3-dibenzyl-2-phenylimidazolidine);
phosphorus-containing electron donors, such as phosphites (e.g., triethyl phosphite, tri-n-propyl phosphite, triisopropyl phosphite, tri-n-butyl phosphite, triisobutyl phosphite, diethyl-n-butyl phosphite and diethylphenyl phosphite); and
oxygen-containing electron donors, such as 2,6-substituted tetrahydropyrans and 2,5-substituted tetrahydropyrans.

These electron donors (b) are used singly or in combination of two or more kinds.

The process for preparing a solid titanium catalyst component for olefin polymerization according to the invention is described above with reference to the case of using hydrous magnesium chloride as the hydrous magnesium halide, but the present invention is not limited thereto and is applicable to the case of using hydrous magnesium bromide or hydrous magnesium iodide as the hydrous magnesium halide.

EFFECT OF THE INVENTION

According to the present invention, an anhydrous magnesium halide solution scarcely containing calcium can be prepared from hydrous magnesium halide containing at least calcium as impurity. Further, a solid titanium catalyst component for olefin polymerization can be prepared by the use of the anhydrous magnesium halide solution as a starting material. The resulting solid titanium catalyst component has catalytic activities nearly equal to those of conventional catalysts prepared by the use of anhydrous magnesium halide for industrial use and/or reagent use.

EXAMPLE

The present invention will be further described with reference to the following examples, but it should be construed that the invention is in no way limited to those examples.

In the following examples, amounts of calcium, sodium and potassium were measured by atomic absorption spectrometry; and amount of magnesium was measured by plasma emission spectroscopic analysis.

Preparation of anhydrous magnesium chloride solution

Example 1

To a 500 ml glass container, 40.6 g (0.2 mol) of magnesium chloride hexahydrate containing calcium as impurity (available from Naikai Engyo K. K., water content: 51.2% by weight, calcium content: 0.109% by weight, sodium content: 0.131% by weight, containing no potassium), 169 g (1.3 mol) of 2-ethylhexanol (available from Mitsubishi Chemical Co., Ltd.) and 0.126 g (1.6 times by mol as much as calcium contained in the magnesium chloride hexahydrate) of potassium chloride (available from Wako Chemical Co., Ltd., special grade) were introduced, and they were mixed to give a mixed solution. The magnesium chloride hexahydrate containing calcium as impurity (available from Naikai Engyo K.K.) used in the following examples has the same composition as that of the magnesium chloride hexahydrate of this example. The resulting mixed solution was stirred and heated at 150° C. for 7 hours, then 170° C. for 2 hours, with passing a nitrogen gas (dew point: not higher than −60° C.) substantially not containing water through the mixed solution at a rate of 5 N-1/hr. By virtue of this operation, the water content in the mixed solution was decreased to 0.0047% by weight. Then, the mixed solution was filtered through a filter of 10 $\mu$m to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.023% by weight and the sodium concentration was not more than 0.008% by weight. In the filtrate, no potassium was detected.

Example 2

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.41 g (5.1 times by mol as much as calcium contained in the magnesium chloride hexahydrate) of potassium chloride (available from Wako Chemical Co., Ltd., special grade) were introduced to a 500 ml glass container. As a result, the water content in the mixed solution was decreased to 0.0034% by weight. Then, the mixed solution was filtered through a filter of 10 $\mu$m to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.025% by weight and the sodium concentration was not more than 0.008% by weight. In the filtrate, no potassium was detected.

Example 3

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.039 g (½ by mol as much as calcium contained in the magnesium chloride hexahydrate) of potassium chloride (available from Wako Chemical Co., Ltd., special grade) were introduced to a 500 ml glass container. As a result, the water content in the mixed solution was decreased to 0.0047% by weight. Then, the mixed solution was filtered through a filter of 10 $\mu$m to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.074% by weight and the sodium concentration was not more than 0.008% by weight. In the filtrate, no potassium was detected.

Example 4

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.163 g (1.5 times by mol as much as calcium contained in the magnesium chloride hexahydrate) of potassium acetate (available from Wako Chemical Co., Ltd., special grade) were introduced to a 500 ml glass container. As a result, the water content in the mixed solution was decreased to 0.0047% by weight. Then, the mixed solution was filtered through a filter of 10 $\mu$m to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.030% by weight and the sodium concentration was not more than 0.008% by weight. In the filtrate, no potassium was detected.

Example 5

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.130 g (1.5 times by mol as much as calcium contained in the magnesium chloride hexahydrate) of potassium carbonate (available from Wako Chemical Co., Ltd., special grade) were introduced to a 500 ml glass container. As a result, the water content in the mixed solution was decreased to 0.0047% by weight. Then, the mixed solution was filtered through a filter of 10 μm to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.035% by weight and the sodium concentration was not more than 0.008% by weight. In the filtrate, no potassium was detected.

Comparative Example 1

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.089 g (1.5 times by mol as much as calcium contained in the magnesium chloride hexahydrate) of sodium carbonate (available from Wako Chemical Co., Ltd., special grade) were introduced to a 500 ml glass container. As a result, the water content in the mixed solution was decreased to 0.0047% by weight. Then, the mixed solution was filtered through a filter of 10 μm to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.205% by weight and the sodium concentration was not more than 0.008% by weight. In the filtrate, no potassium was detected.

Comparative Example 2

The procedure of Example 1 was repeated, except that 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.301 g (5.0 times by mol as much as calcium contained in the magnesium chloride hexahydrate) of sodium carbonate (available from Wako Chemical Co., Ltd., special grade) were introduced to a 500 ml glass container. As a result, the water content in the mixed solution was decreased to 0.0047% by weight. Then, the mixed solution was filtered through a filter of 10 μm to remove the precipitated calcium compound and to obtain a filtrate. The filtrate was examined for composition.

That is, the concentrations of calcium, sodium and potassium in the filtrate were measured. As a result, in terms of concentrations in the anhydrous magnesium chloride, the calcium concentration was 0.202% by weight and the sodium concentration was not more than 0.008% by weight. In the filtrate, no potassium was detected.

Comparative Example 3

A filtrate containing anhydrous magnesium chloride was obtained in the same manner as in Example 1, except that no potassium chloride was added.

The concentrations of calcium, sodium and potassium in the filtrate were measured. As a result, in terms of concentrations in the anhydrous magnesium chloride, the calcium concentration was 0.250% by weight and the sodium concentration was not more than 0.008% by weight.

Preparation of titanium catalyst component

Example 6

Preparation of starting material of catalyst component (A)

To a 500 ml glass container, 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.126 g (1.6 times by mol as much as calcium contained in the magnesium chloride hexahydrate) of potassium chloride (available from Wako Chemical Co., Ltd., special grade) were introduced, and they were mixed to give a mixed solution. The mixed solution was stirred and heated at 150° C. for 7 hours, then 170° C. for 2 hours, with passing a nitrogen gas (dew point: not higher than −60 ° C.) substantially not containing water through the mixed solution at a rate of 5 N-1/hr. By virtue of this operation, the water content in the mixed solution was decreased to 0.0047% by weight. Subsequently, the rate of the nitrogen gas passed through the mixed solution was varied to 30 N-1/hr and the heating temperature was varied to 185° C., whereby a part of 2-ethylhexanol was distilled off so that the molar ratio between magnesium chloride and 2-ethylhexanol became 1:3. Then, the temperature of the solution was decreased to 110° C., and to the solution was added 88 ml of n-decane (available from Sun Technochemical K.K.), followed by sufficiently stirring. Thereafter, the mixed solution was filtered through a filter of 10 μm in an atmosphere of nitrogen to remove the precipitated calcium compound, etc. and to obtain a filtrate. To the filtrate was added 4.43 g of phthalic anhydride (available from Wako Chemical Co., Ltd., special grade), and the mixture was heated at 130° C. for 1 hour to obtain a homogeneous solution.

Then, the concentrations of calcium, sodium and potassium in the solution were measured. As a result, in terms of concentrations in the anhydrous magnesium chloride, the calcium concentration was 0.023% by weight and the sodium concentration was not more than 0.008% by weight. In the solution, no potassium was detected.

Preparation of catalyst component (A)

The homogeneous solution obtained above was cooled to room temperature, and 75 ml of the solution was dropwise added to 200 ml of titanium tetrachloride (available from Sumitomo Citics K.K.) cooled at −20° C., over a period of 45 minutes. The resulting mixed solution was heated to 110° C. over a period of 4 hours. When the temperature of the mixed solution reached 110° C., to the solution was added 5 ml of diisobutyl phthalate (available from Wako Chemical Co. Ltd., special grade), followed by stirring at the same temperature as above for 2 hours. After the reaction was completed, the resulting solid was recovered by hot filtration. The solid was resuspended in 200 ml of titanium tetrachloride, and the suspension was stirred at 110° C. for 2 hours. After the reaction was completed, the resulting solid was recovered again by hot filtration. The solid was washed with n-decane at 110° C. and then with hexane at room temperature until any titanium liberated in the washing liquid was not detected. The obtained solid is referred to as "catalyst component (A)". A part of the catalyst component (A) was dried to analyze its composition, and the remainder was stored as a hexane slurry. The catalyst component (A) contained 2.6% by weight of titanium, 20% by weight of magnesium, 62% by weight of chlorine and 12.5% by weight of diisobutyl phthalate.

Polymerization

To a 2 liter autoclave, 750 ml of dehydrated hexane was introduced. Then, 0.75 mmol of triethylaluminum (available from Tosoh Aquezo K.K.), 0.075 mmol of cyclohexylmethyldimethoxysilane (available from Shinetsu Chemical Industry Co., Ltd.) and 0.015 mmol (in terms of titanium atom) of the catalyst component (A) were fed to the autoclave at room temperature in an atmosphere of propylene (available from Ukishima Sekiyu Kagaku K.K.). After 200 ml of hydrogen (available from Japan Oxygen Co., Ltd., high-purity hydrogen) was fed to the autoclave, the temperature of the autoclave was raised to 70° C., and also propylene was fed to the autoclave for 2 hours to perform polymerization. The pressure during the polymerization was maintained at 7 kg/cm$^2$-G.

After the polymerization was completed, a slurry containing a polymer produced was filtered to separate the slurry into a white powder polymer and a liquid phase. The yield of the white powder polymer after drying was 420 g, which corresponded to activities of 28,000 g-PP/mmol-Ti.

Example 7

Preparation of stating material of catalyst component (B)

To a 500 ml glass container, 40.6 g (0.2 mol) of magnesium chloride hexahydrate containing calcium as impurity (available from Naikai Engyo K.K.), 169 g (1.3 mol) of 2-ethylhexanol (available from Mitsubishi Chemical Co., Ltd.) and 0.41 g (5.1 times by mol as much as calcium contained in the magnesium chloride hexahydrate) of potassium chloride (available from Wako Chemical Co., Ltd., special grade) were introduced, and they were mixed to give a mixed solution. The mixed solution was stirred and heated at 150° C. for 7 hours, then 170° C. for 2 hours, with passing a nitrogen gas (dew point: not higher than −60° C.) substantially not containing water through the mixed solution at a rate of 5 N-1/hr. By virtue of this operation, the water content in the mixed solution was decreased to 0.0034% by weight. Subsequently, the rate of the nitrogen gas passed through the mixed solution was varied to 30 N-1/hr and the heating temperature was varied to 185° C., whereby a part of 2-ethylhexanol was distilled off so that the molar ratio between magnesium chloride and 2-ethylhexanol became 1:3. Then, the temperature of the solution was decreased to 110° C., and to the solution was added 88 ml of n-decane (available from Sun Technochemical K.K.), followed by sufficiently stirring. Thereafter, the mixed solution was filtered through a filter of 10 μm in an atmosphere of nitrogen to remove the precipitated calcium compound and to obtain a filtrate. To the filtrate was added 4.43 g of phthalic anhydride (available from Wako Chemical Co., Ltd., special grade), and the mixture was heated at 130° C. for 1 hour to obtain a homogeneous solution.

Then, the concentrations of calcium, sodium and potassium in the solution were measured. As a result, in terms of concentrations in the anhydrous magnesium chloride, the calcium concentration was 0.025% by weight and the sodium concentration was 0.008% by weight. In the solution, no potassium was detected.

Preparation of catalyst component (B)

The procedure of "preparation of catalyst component (A)" in Example 6 was repeated except that the above-obtained homogeneous solution was used, to obtain a catalyst component (B). The catalyst component (B) contained 2.6% by weight of titanium, 19% by weight of magnesium, 61% by weight of chlorine and 12.8% by weight of diisobutyl phthalate.

Polymerization

Polymerization of propylene was carried out in the same manner as in "polymerization" of example 6, except that the catalyst component (B) was used. As a result, 415 g of a white powder polymer was obtained. This yield corresponded to activities of 27,500 g-PP/mmol-Ti.

Comparative Example 4

The procedures of "preparation of starting material of catalyst component (A)" and "preparation of catalyst component (A)" in Example 6 were repeated except that no potassium chloride was added, to obtain a solid (catalyst component). The catalyst component contained 2.5% by weight of titanium, 20% by weight of magnesium, 62% by weight of chlorine and 12.4% by weight of diisobutyl phthalate.

Polymerization

Polymerization of propylene was carried out in the same manner as in "polymerization" of example 6, except that the above-obtained solid was used. The yield of a white powder polymer after drying was 306 g, which corresponded to activities of 20,400 g-PP/mmol-Ti.

What is claimed is:

1. A process for preparing an anhydrous magnesium halide solution, comprising distilling water off from an oxygen-containing organic solvent solution of hydrous magnesium halide containing a calcium compound as an impurity, to prepare an oxygen-containing organic solvent solution of anhydrous magnesium halide, wherein at any stage of the step of preparing the oxygen-containing organic solvent solution of hydrous magnesium halide to the step of preparing the oxygen-containing organic solvent solution of anhydrous magnesium halide, a potassium compound is added in such an amount that the amount thereof becomes 0.1 to 20 times by mol. as much as the calcium compound, whereby the calcium compound is contacted with the potassium compound to precipitate calcium compound together with potassium compound, followed by removing them from the oxygen-containing organic solvent solution of anhydrous magnesium halide and recovering an anhydrous magnesium halide solution having a reduced amount of a calcium compound as an impurity.

2. A process for preparing an anhydrous magnesium halide solution from hydrous magnesium halide containing a calcium compound as an impurity, comprising a step of preparing an oxygen-containing solvent solution of anhydrous magnesium halide containing a calcium compound as an impurity, wherein at any stage of said step, a potassium compound is added in such an amount that the amount thereof becomes 0.1 to 20 times by mol, as much as the calcium compound, whereby the calcium compound is contacted with the potassium compound to precipitate the calcium compound together with the potassium compound, followed by removing them from the oxygen-containing organic solvent solution of anhydrous magnesium halide and recovering an anhydrous magnesium halide solution having a reduced amount of a calcium compound as an impurity.

3. A process for preparing a solid titanium catalyst component for olefin polymerization, comprising contacting the anhydrous magnesium halide solution, which is prepared 39 by the process as claimed in claim 1 or claim 2, with a liquid titanium compound to precipitate a solid titanium catalyst component.

4. A process for preparing a solid titanium catalyst component for olefin polymerization, comprising contacting a solution, which is obtained by adding a hydrocarbon solvent to the anhydrous magnesium halide solution prepared by the process as claimed in claim 1 or claim 2, with a liquid titanium compound to precipitate a solid titanium catalyst component.

5. A process for preparing a solid titanium catalyst component for olefin polymerization, comprising contacting a solution, which is obtained by adding a hydrocarbon solvent and an electron donor other than the oxygen-containing organic solvent to the anhydrous magnesium halide solution prepared by the process as claimed in claim 1 or claim 2, with a liquid titanium compound to precipitate a solid titanium catalyst component.

6. The process of claim 1 or claim 2 for preparing an anhydrous magnesium halide solution having a reduced calcium compound concentration, wherein the recovered anhydrous magnesium halide solution contains 0.074% by weight or less calcium ion, based on the amount of magnesium halide.

7. The process of claim 1 or claim 2 for preparing an anhydrous magnesium halide solution having a reduced calcium compound concentration, wherein the oxygen-containing organic solvent comprises 2-ethylhexanol.

8. The process of claim 1 or claim 2 for preparing an anhydrous magnesium halide solution having a reduced calcium compound concentration, wherein the hydrous magnesium halide is obtained from sea water.

9. The process of claim 1 or claim 2 for preparing an anhydrous magnesium halide solution having a reduced calcium compound concentration, wherein the oxygen-containing organic solvent is a member selected from the group consisting of ethers, ketones, alcohols, organic epoxy compounds and organic phosphates.

10. A process for preparing an anhydrous magnesium chloride solution from a hydrous magnesium chloride obtained from sea water and containing a calcium compound as an impurity and for reducing the amount of said calcium compound impurity in the hydrous magnesium chloride, which comprises preparing an anhydrous magnesium chloride solution by distilling water off from an oxygen-containing organic solvent solution of said hydrous magnesium chloride to obtain an oxygen-containing organic solvent solution of anhydrous magnesium chloride and a calcium compound impurity and adding to the oxygen-containing organic solvent solution before, during or after said distillation a potassium compound in such an amount that the amount thereof becomes 0.1 to 20 times by mol as much as the calcium compound, whereby the calcium compound is contacted with the potassium compound to precipitate said calcium compound together with said potassium compound, followed by removing said precipitated calcium and potassium compounds from the oxygen-containing organic solvent solution of anhydrous magnesium chloride and recovering an anhydrous magnesium chloride solution having a reduced amount of calcium compound impurity.

11. The process of claim 10 for preparing an anhydrous magnesium chloride solution having a reduced calcium compound concentration, wherein the recovered anhydrous magnesium chloride solution contains 0.074% by weight or less calcium ion, based on the amount of magnesium chloride.

12. The process of claim 10 for preparing an anhydrous magnesium chloride solution having a reduced calcium compound concentration, wherein the oxygen-containing organic solvent comprises 2-ethylhexanol.

13. The process of claim 10 for preparing an anhydrous magnesium chloride solution having a reduced calcium compound concentration wherein the hydrous magnesium chloride is obtained from bittern from sea water.

* * * * *